US012720435B2

(12) United States Patent
Kim

(10) Patent No.: US 12,720,435 B2
(45) Date of Patent: Aug. 25, 2026

(54) METHOD AND APPARATUS FOR DISCONTINUOUS RECEPTION IN MOBILE WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 332 days.

(21) Appl. No.: 18/616,204

(22) Filed: Mar. 26, 2024

(65) Prior Publication Data

US 2024/0334333 A1 Oct. 3, 2024

(30) Foreign Application Priority Data

Mar. 31, 2023 (KR) ........................ 10-2023-0042587

(51) Int. Cl.
*H04W 76/28* (2018.01)
*H04W 52/02* (2009.01)

(52) U.S. Cl.
CPC ... *H04W 52/0235* (2013.01); *H04W 52/0216* (2013.01); *H04W 76/28* (2018.02)

(58) Field of Classification Search
CPC ......... H04W 52/0235; H04W 52/0216; H04W 76/28; H04W 72/231; Y02D 30/70
See application file for complete search history.

(56) References Cited

U.S. PATENT DOCUMENTS

2023/0026297 A1* 1/2023 Kim ...................... H04W 76/28
2025/0176067 A1* 5/2025 Khoshkholgh Dashtaki ............... H04W 76/28
2025/0203707 A1* 6/2025 Tsai ...................... H04W 76/28
2025/0254754 A1* 8/2025 Ma ........................ H04W 76/28
2025/0261275 A1* 8/2025 Wang ................ H04W 52/0245

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification (Release 17).
3GPP TS 38.331 V17.4.0 (Mar. 2023); Technical Specification; 3rd Generation Partnership Project; Technical Specification Group Radio Access Network; NR; Radio Resource Control (RRC) protocol specification (Release 17).
Qualcomm Incorporated, "DRX enhancements for XR," 3GPP TSG-RAN WG2 Meeting #120, Toulouse France, R2-2211180, Nov. 14-18, 2022.
ZTE Corporation et al., "Scheduling enhancements for XR," 3GPP TSG-RAN2#120, Toulouse, France, R2-2211527, Nov. 14-18, 2022.
Nokia et al., "BS Tables for XR," 3GPP TSG-RAN WG2 Meeting #120, Toulouse, France, R2-2211600, Nov. 14-18, 2022.

(Continued)

*Primary Examiner* — Christopher M Brandt
(74) *Attorney, Agent, or Firm* — Nicholas Park

(57) ABSTRACT

A method and apparatus for enhanced discontinuous reception is provided. Method for discontinuous reception includes receiving a downlink RRC message from the base station, determining a first subframe to start the first timer based on first counter and second counter and starting the first timer based on the determination. The second counter is set to a specific value if a specific DRX parameter is present.

20 Claims, 6 Drawing Sheets

(56) References Cited

OTHER PUBLICATIONS

Nokia et al., "XR Capacity Enhancements," 3GPP TSG-RAN WG2 Meeting #120, Toulouse, France, R2-2211601, R2-2209559, Nov. 14-18, 2022.
Futurewei, "Discussion on BSR enhancements," 3GPP TSG-RAN WG2 Meeting #120, Toulouse, France, R2-2212517, Nov. 14-18, 2022.
Ericsson, "Discussion on Scheduling enhancements," 3GPP TSG-RAN WG2 #120, Toulouse, France, R2-2212890, Nov. 14-18, 2022.
Huawei et al., "Further discussion on C-DRX enhancements for XR," 3GPP TSG-RAN WG2 Meeting #121, Athens, Greece, R2-2300118, Feb. 27-Mar. 3, 2023.
3GPP TR 38.835 V1.0.1 (Feb. 2023); Technical Report; 3rd Generation Partnership Project; Technical Specification Group Radio Access Network; NR; Study on XR enhancements for NR (Release 18), R2-2300152.
Qualcomm Incorporated, "Discussion on PDU discard," 3GPP TSG-RAN WG2 Meeting #121, R2-2300186, Athens, Feb. 27-Mar. 4, 2023.
Qualcomm Incorporated, "DRX enhancements for XR," 3GPP TSG-RAN WG2 Meeting #121, Athens, R2-2300188, Feb. 27-Mar. 4, 2023.
Intel Corporation, "RAN2 implications on PDU Set and Data Burst based on SA2 inputs," 3GPP TSG RAN WG2 Meeting #121, Athens, Greece, R2-2300428, Feb. 27-Mar. 3, 2023.
Ericsson, "Discussion on PDU Discard," 3GPP TSG-RAN WG2 #121, Athens, Greece, R2-2301509, Feb. 27-Mar. 3, 2023.
Ericsson, "Discussion on PDU Prioritization," 3GPP TSG-RAN WG2 #121, Athens, Greece, R2-2301511, Feb. 27-Mar. 3, 2023.

* cited by examiner

METHOD AND APPARATUS FOR DISCONTINUOUS RECEPTION IN MOBILE WIRELESS COMMUNICATION SYSTEM

CROSS-REFERENCE TO RELATED APPLICATION

This application claims priority to and the benefit of Korean Patent Application No. 10-2023-0042587, filed on Mar. 31, 2023, the disclosure of which is incorporated herein by reference in its entirety.

BACKGROUND

Technical Field

The present disclosure relates to enhanced discontinuous reception for extended reality in a mobile communication system. More specifically, the present disclosure relates to determining starting point of active time and performing discontinuous reception in mobile wireless communication system.

Related Art communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability.

Extended Reality (XR) refers to all real-and-virtual combined environments and human-machine interactions generated by computer technology and wearables. XR is an umbrella term for different types of realities.

During a XR service, huge amount of Data Bursts may be generated and transmitted over NR downlink and uplink. It may cause excessive battery consumption and control channel shortage due to frequent data transfer.

To make the XR services sustainable in NR network, it is necessary to reduce the battery consumption and control channel usage.

As a method to reduce battery consumption, discontinuous reception is widely used. In order to efficiently provide XR services, it is necessary to improve discontinuous reception.

SUMMARY

Aspects of the present disclosure are to enhance the discontinuous operation. The method includes receiving a downlink RRC message from the base station, determining a first subframe to start the first timer based on first counter and second counter and starting the first timer based on the determination. The second counter is set to a specific value if a specific DRX parameter is present.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

In this disclosure, means and apparatus to reduce the power consumption during XR service are provided.

Figure 1A:
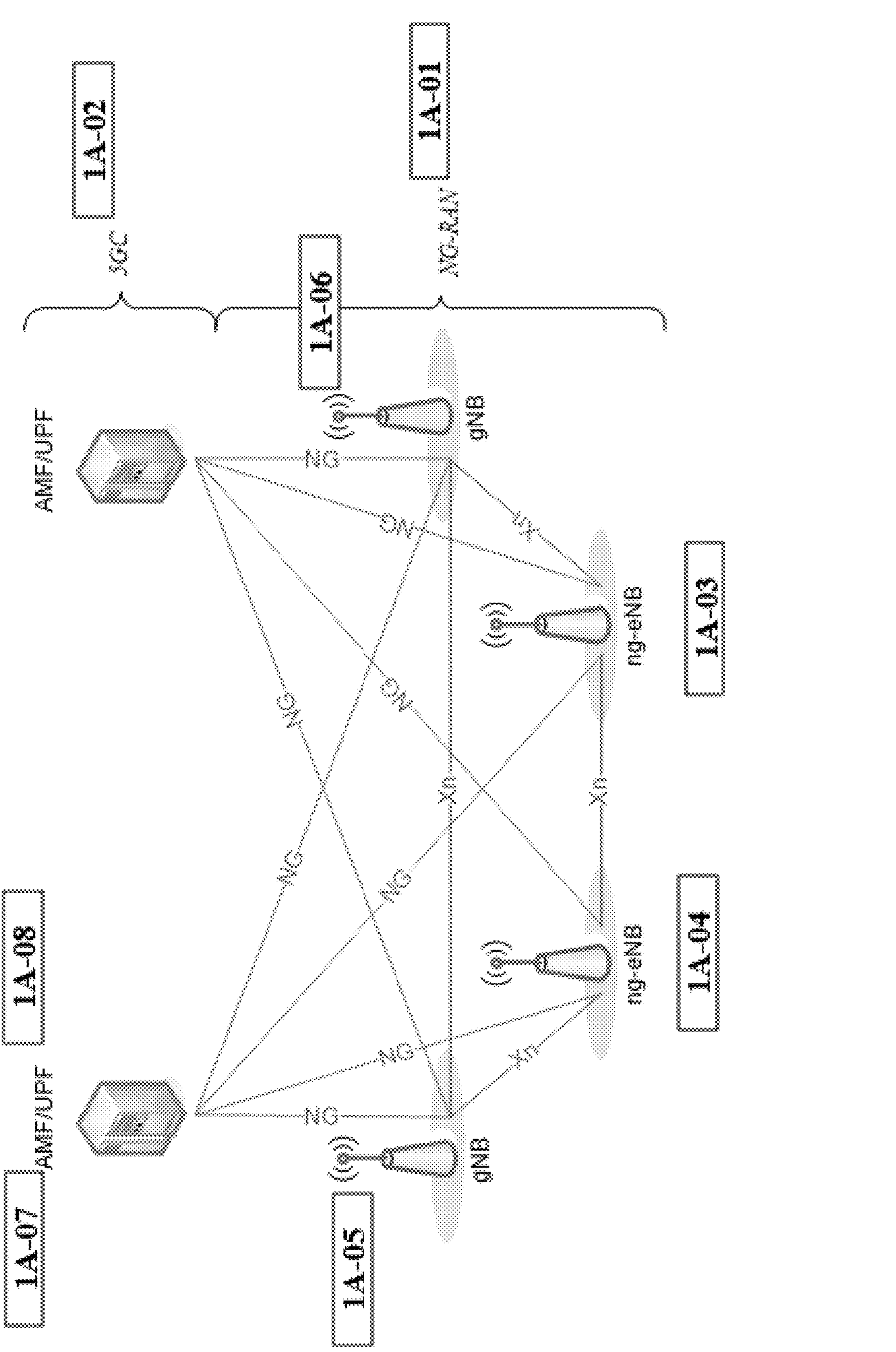
FIG. 1A is a diagram illustrating the architecture of an 5G system and a NG-RAN.

FIG. 1A is a diagram illustrating the architecture of an 5G system and a NG-RAN to which the disclosure may be applied.

5G system consists of NG-RAN (1A-01) and 5GC (1A-02). An NG-RAN node is either gNB (providing NR user plane and control plane protocol terminations towards the terminal) or an ng-eNB (providing E-UTRA user plane and control plane protocol terminations towards the terminal).

The gNBs (1A-05 or 1A-06) and ng-eNBs (1A-03 or 1A-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1A-07) and UPF (1A-08) may be realized as a physical node or as separate physical nodes.

A gNB (1A-05 or 1A-06) or an ng-eNBs (1A-03 or 1A-04) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and

- IP and Ethernet header compression, uplink data decompression and encryption of user data stream; and
- Selection of an AMF at UE attachment when no routing to an MME can be determined from the information provided by the terminal; and

- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and
- Session Management; and
- QoS Flow management and mapping to data radio bearers; and
- Support of UEs in RRC_INACTIVE state; and
- Radio access network sharing; and
- Tight interworking between NR and E-UTRA; and
- Support of Network Slicing.

The AMF (1A-07) hosts the functions such as NAS signaling, NAS signaling security, AS security control, SMF selection, Authentication, Mobility management and positioning management.

The UPF (1A-08) hosts the functions such as packet routing and forwarding, transport level packet marking in the uplink, QoS handling and the downlink, mobility anchoring for mobility etc.

Figure 1B:
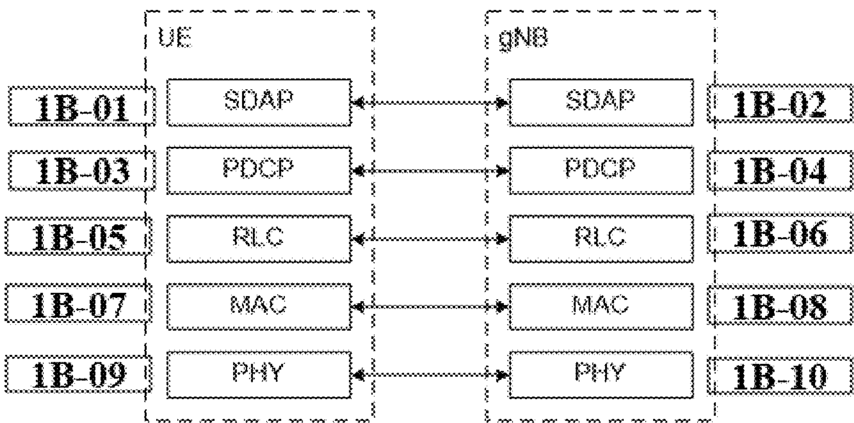
FIG. 1B is a diagram illustrating a wireless protocol architecture in an 5G system.
Figure 1B:
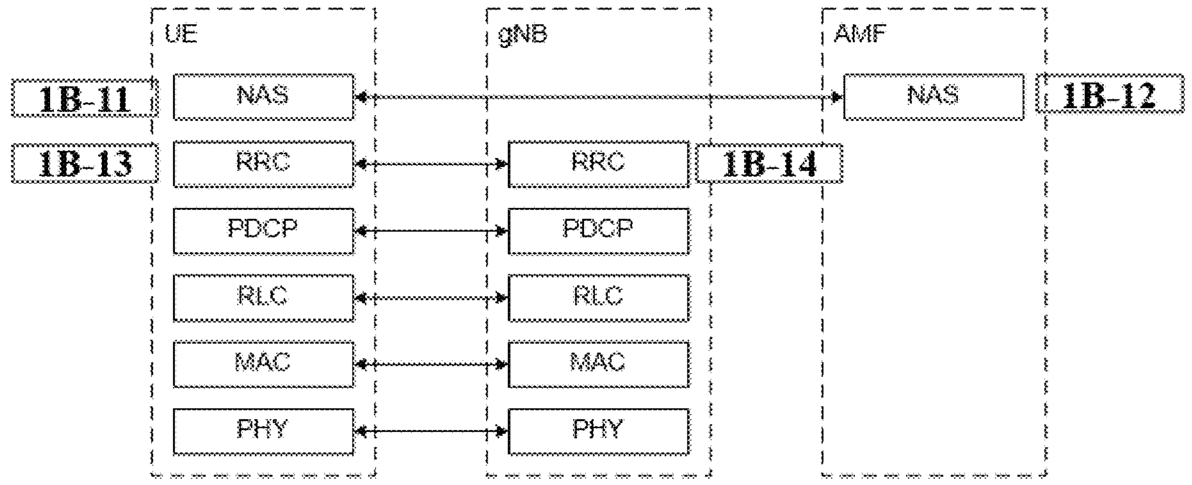

FIG. 1B is a diagram illustrating a wireless protocol architecture in an 5G system to which the disclosure may be applied.

User plane protocol stack consists of SDAP (1B-01 or 1B-02), PDCP (1B-03 or 1B-04), RLC (1B-05 or 1B-06), MAC (1B-07 or 1B-08) and PHY (1B-09 or 1B-10). Control plane protocol stack consists of NAS (1B-11 or 1B-12), RRC (1*b*-13 or 1*b*-14), PDCP, RLC, MAC and PHY.

Each protocol sublayer performs functions related to the operations listed below.

- NAS: authentication, mobility management, security control etc
- RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.
- SDAP: Mapping between a QoS flow and a data radio bearer, Marking QoS flow ID (QFI) in both DL and UL packets.
- PDCP: Transfer of data, Header compression and decompression, Ciphering and deciphering, Integrity protection and integrity verification, Duplication, Reordering and in-order delivery, Out-of-order delivery etc.
- RLC: Transfer of upper layer PDUs, Error Correction through ARQ, Segmentation and re-segmentation of RLC SDUs, Reassembly of SDU, RLC re-establishment etc.
- MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.
- PHY: Channel coding, Physical-layer hybrid-ARQ processing, Rate matching, Scrambling, Modulation, Layer mapping, Downlink Control Information, Uplink Control Information etc.

Figure 2A:
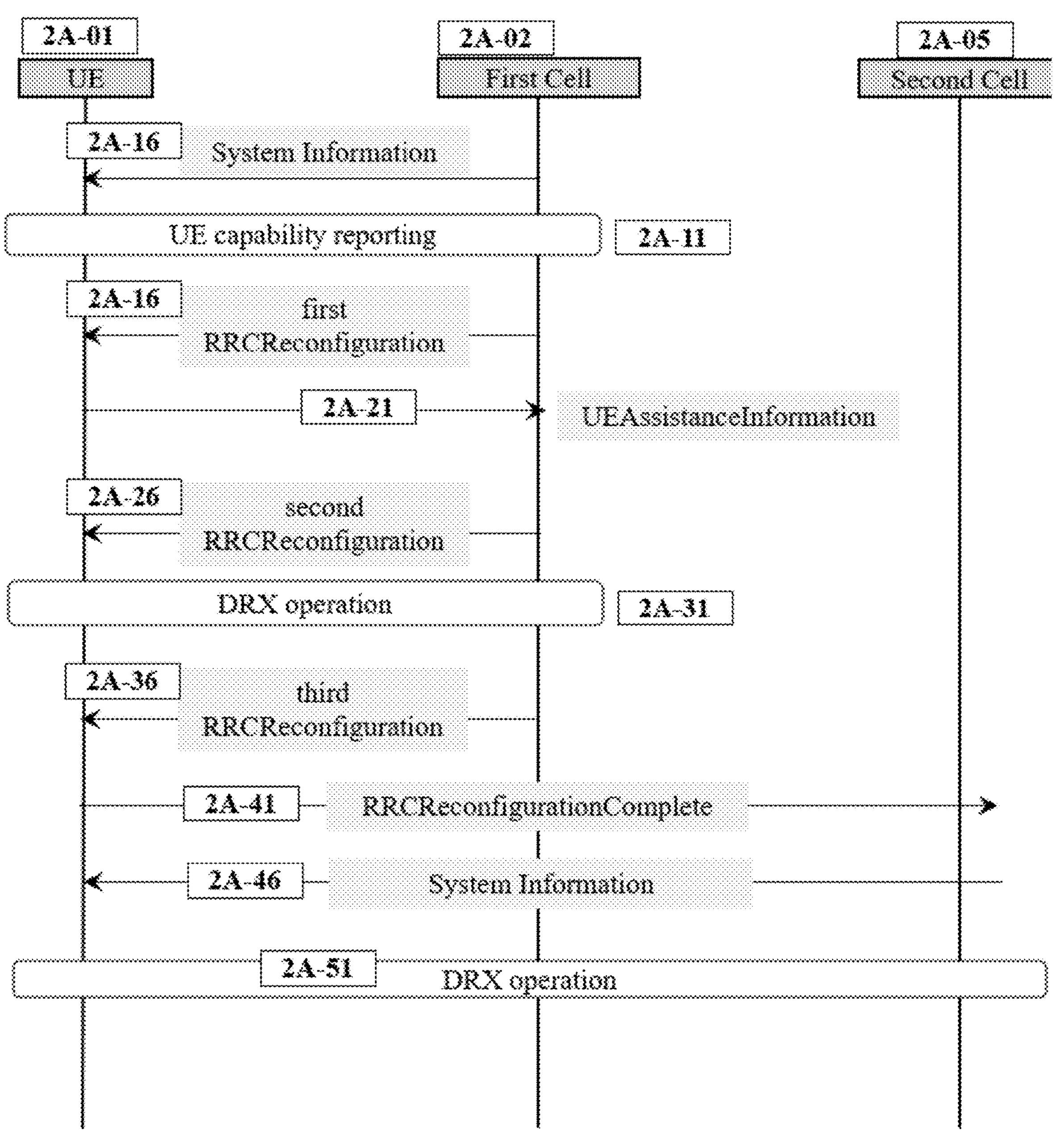
FIG. 2A is a diagram illustrating operations of the terminal and a base station according to an embodiment of the present invention.

FIG. 2A illustrates the operations of the terminal and base station according to the embodiments of the invention.

In 2A-06, the terminal receives a system information in a first cell from a base station.

The system information includes following fields.

- frame_number: This field indicates an integer between 0 and 1023. It increments by one every radio frame.

The terminal initialize the first_counter with the received frame_number.

In 2A-11, the terminal transmits a UECapabilityInformation to the base station.

The UECapabiiltylnformation includes following fields.

- a first capability information indicates whether the terminal supports reporting of one or more uplink traffic patterns for a radio bearer.
- a second capability information indicates whether the terminal supports on_duration_starting_point_determination_mode_2. If the terminal supports on_duration_starting_point_determination_mode_2, the terminal shall also support non-integer value periodicity for DRX operation.

The base station determines configurations for the terminal based on the capability information.

In 2A-16, the terminal receives a RRCReconfiguration from the base station.

The RRCReconfiguration can include measurement configuration information which includes following fields.

- one or more measurement_object_configurations.
- one or more measurement_report_configurations.
- one or more measurement_gap_configurations. Each measurement_gap_configuration includes following fields.
  - measurement gap offset.
  - measurement gap length.
  - measurement gap periodicity.

The terminal performs measurements on the measurement objects and performs measurement reporting based on the one or more measurement_report_configurations.

The RRCReconfiguration can include one or more radio bearer configurations. Each radio bearer configuration includes following fields.

- radio bearer identifier.
- PDCP configuration.
- indicator for PDCP reestablishment.
- indicator for PDCP recovery.
- PDU session identifier.
- one or more QoS flow Identifiers.

The terminal establishes PDCP entities and radio bearers based on the radio bearer configurations.

The RRCReconfiguration can include MAC configuration information which includes following fields.

- BSR configuration.

The terminal configures BSR based on the BSR configuration.

The RRCReconfiguration can include UEAssistancelnformation configuration information which includes following fields.

- uplink_traffic_pattern_reporting_indication.
  - List of radio bearer identifiers: List of radio bearers for which uplink traffic pattern reporting is allowed.

If the base station is capable of configuring DRX based on uplink traffic pattern and the terminal reported that it can report uplink traffic pattern, the base station includes Indication_uplink_traffic_pattern_reporting.

The terminal consider uplink traffic pattern reporting for XR traffic is allowed based on that uplink_traffic_pattern_reporting_indication is present.

In 2A-21, the terminal transmits a UEAssistancelnformation to the base station.

UE determines the traffic pattern information for a radio bearer if the radio bearer is configured for XR traffic (e.g. QoS flows for NR are served by the radio bearer).

When uplink traffic is generated for the radio bearers indicated by the list of radio bearer identifiers, the terminal determines the traffic pattern. The terminal creates uplink traffic pattern information. If one pattern is not enough, more than one patterns can be created.

The terminal generates UEAssistanceInformation for uplink traffic pattern reporting.

The UEAssistanceInformation includes following fields.

Uplink_Traffic_Pattern_Information.

radio_bearer_Identifier: This field indicates the radio bearer where the uplink traffic is served.

one or multiple pattern_Info. Each pattern_info comprises following fields.

PDU_arrival_offset: this field indicates the estimated timing for a specific PDU set arrival in the uplink of the corresponding bearer.

PDU_arrival_periodicity: this field indicates the estimated PDU set arrival periodicity in the uplink of the corresponding bearer.

Each pattern corresponds to a specific time pattern indicated by the corresponding PDU_arrival_offset and the corresponding PDU_arrival_periodicity.

The base station determines DRX configurations based on the uplink traffic patterns reported by the terminal and the downlink traffic patterns observed by the base station itself.

The base station determines uplink configured grant configurations based on the uplink traffic patterns reported by the terminal.

In 2A-26, the base station transmits a second RRCReconfiguration to the terminal.

If the RRCReconfiguration includes DRX configuration, the terminal and the base station performs DRX operation. If DRX is configured for the terminal, the terminal monitors PDCCH during an Active Time. the terminal does not monitor PDCCH during Non-Active Time.

Active Time is when a drx-onDurationTimer or drx-InactivityTimer or drx-RetransmissionTimer is running.

Serving Cells of the terminal may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are drx-onDurationTimer and drx-InactivityTimer and drx-LongCycleStartOffset2. The DRX parameters that are common to the DRX groups are drx-SlotOffset and drx-RetransmissionTimerDL and drx-RetransmissionTimerUL and drx-LongCycleStartOffset and onDurationStartAccumulated.

Various DRX configurations can be included in a MAC-CellGroupConfig in a RRCReconfiugration.

A MAC-CellGroupConfig can includes DRX configurations as shown below.

```
MAC-CellGroupConfig ::=          SEQUENCE {
   drx-Config                    SetupRelease { DRX-Config } OPTIONAL, -- Need M
   drx-ConfigSecondaryGroup      SetupRelease { DRX-ConfigSecondaryGroup }
OPTIONAL -- Need M
   ]],
      drx2-Config                  SetupRelease { DRX2-Config }   OPTIONAL, --
Need M
      drx2-ConfigSecondaryGroup    SetupRelease { DRX2-Config }   OPTIONAL, --
Need M
      drx3-Config                  DRX3-Config                    OPTIONAL, --
Need R
      drx3-ConfigSecondaryGroup    DRX3-Config                    OPTIONAL, --
Need R
...
       MAC-CellGroupConfig ::= SEQUENCE {
          drx-Config SetupRelease { DRX-Config } OPTIONAL, -- Need M
          drx-ConfigSecondaryGroup   SetupRelease{DRX-
ConfigSecondaryGroup } OPTIONAL -- Need M
          ]],
             drx2-Config SetupRelease { DRX2-Config } OPTIONAL, -- Need M
             drx2-ConfigSecondaryGroup   SetupRelease { DRX2-Config }
OPTIONAL, -- Need M
             drx3-Config DRX3-Config OPTIONAL, -- Need R
             drx3-ConfigSecondaryGroup   DRX3-Config OPTIONAL, -- Need
R
       ...
```

DRX-Config includes DRX configuration for the primary DRX group. This Information Element (IE) includes fields shown below.

```
DRX-Config ::= SEQUENCE {
   drx-onDurationTimer CHOICE {
      subMilliSeconds INTEGER (1..31),
      milliSeconds ENUMERATED {ms1, ms2,... }
   },
  drx-InactivityTimer ENUMERATED {ms0, ms1, ms2, ... },
   drx-RetransmissionTimerDL   ENUMERATED {
      sl0, sl1, ... },
  drx-RetransmissionTimerUL   ENUMERATED {
      sl0, sl1, sl2, ... },
  drx-LongCycleStartOffset             CHOICE {
   ms10                           INTEGER(0..9),
   ms20                           INTEGER(0..19),
   ms32                           INTEGER(0..31),
   ms40                           INTEGER(0..39),
   ms60                           INTEGER(0..59),
   ms64                           INTEGER(0..63),
   ms70                           INTEGER(0..69),
   ms80                           INTEGER(0..79),
   ms128                          INTEGER(0..127),
   ms160                          INTEGER(0..159),
   ms256                          INTEGER(0..255),
   ms320                          INTEGER(0..319),
   ms512                          INTEGER(0..511),
   ms640                          INTEGER(0..639),
   ms1024                         INTEGER(0..1023),
   ms1280                         INTEGER(0..1279),
   ms2048                         INTEGER(0..2047),
```

-continued

```
        ms2560                    INTEGER(0..2559),
        ms5120                    INTEGER(0..5119),
        ms10240                   INTEGER(0..10239)
    },
    ...
}
```

drx-InactivityTimer field indicates a value in multiple integers of 1 ms. ms0 corresponds to 0, ms 1 corresponds to 1 ms, ms2 corresponds to 2 ms, and so on. The terminal starts or restarts the timer when PDCCH indicating new transmission is received. This field indicates the length of drx-InactivityTimer for the primary DRX group.

drx-LongCycleStartOffset field is defined as a CHOICE structure. The CHOICE structure is defined with 20 integer sets. Each integer set has different value range (ranges from zero to a specific maximum value). This field includes an integer and an information indicating from which integer set the integer is chosen. The integer is drx-StartOffset. Sum of the maximum value of the integer set and one is equal to drxLongCycle. drx-LongCycleStartOffset field indicates a drx-LongCycle and drx-StartOffset that are commonly applied to the primary DRX group and the secondary DRX group.

drx-onDurationTimer field indicates a value in multiples of 1/32 ms (subMilliSeconds) or in ms (milliSecond). This field indicates the length of drx-onDurationTimer of the primary DRX group.

drx-RetransmissionTimerDL field indicates a value in number of slot lengths of the BWP where the transport block was received. This field indicates the length of drx-RetransmissionTimerDL that are commonly applied to the primary DRX group and the secondary DRX group. drx-RetransmissionTimerDL is used for monitoring PDCCH for downlink retransmission.

drx-RetransmissionTimerUL field indicates a value in number of slot lengths of the BWP where the transport block was transmitted. This field indicates the length of drx-RetransmissionTimerUL that are commonly applied to the primary DRX group and the secondary DRX group. drx-RetransmissionTimerUL is used for monitoring PDCCH for uplink retransmission.

DRX-ConfigSecondaryGroup includes configuration information for the secondary DRX group. This IE includes following fields.

drx-onDurationTimer field indicates drx-onDurationtimer value for secondary DRX group.

drx-InactivityTimer field indicates drx-InactivityTimer value for secondary DRX group.

DRX2-Config IE in drx2-Config field includes an information on additional periodicity and additional offset for the primary DRX group.

```
DRX2-Config ::= SEQUENCE {
    drx-LongCycleStartOffset2   CHOICE {
    ms16.7                  INTEGER(0..16),
    ms33.4                  INTEGER(0..33),
    ms50.1                  INTEGER(0..50),
    },
...
}
```

This IE includes drx-LongCycleStartOffset2 field. The drx-LongCycleStartOffset2 field in drx2-Config field replaces drx-LongCycleStartOffset field in drx-Config field for the primary DRX group. The drx-LongCycleStartOffset2 field in drx2-Config field does not replace drx-LongCycleStartOffset field in drx-Config field for the secondary DRX group.

drx-LongCycleStartOffset2 field is defined as another CHOICE structure with another plurality of integer sets. The base station includes in this field an integer and an information indicating from which integer set the integer is chosen. Each integer set is mapped with a specific non-integer value. The maximum value of the integer set is equal to the closest lower integer to the mapped non-integer value. The mapped non-integer value of the integer set from which the integer is chosen is drxLongCycle. The integer itself is drx-StartOffset. drx-LongCycleStartOffset2 field of drx2-Config field indicates a drx-LongCycle and drx-StartOffset that are applied to the primary DRX group.

DRX2-Config IE in drx2-ConfigSecondaryGroup field includes an information on additional periodicity and additional offset for the secondary DRX group.

The drx-LongCycleStartOffset2 field in drx2-ConfigSecondaryGroup field replaces drx-LongCycleStartOffset field in drx-Config field for the secondary DRX group. The drx-LongCycleStartOffset2 field in drx2-ConfigSecondaryGroup field does not replace drx-LongCycleStartOffset field in drx-Config field for the primary DRX group.

drx-LongCycleStartOffset2 field in drx2-ConfigSecondaryGroup field includes an integer and an information indicating from which integer set the integer is chosen from. drx-LongCycleStartOffset2 field of drx2-ConfigSecondaryGroup field indicates a drx-LongCycle and drx-StartOffset that are applied to the secondary DRX group.

Depending on presence/absence of drx-LongCycleStartOffset2 field, drx-LongCycle and drx-StartOffset for each DRX group are determined as followings.

If drx-LongCycleStartOffset2 field is indicated for the primary DRX group (if drx2-Config field is set to 'setup') and if drx-LongCycleStartOffset2 field is indicated for the secondary DRX group (if drx2-ConfigSecondaryGroup field is set to 'setup'),
  drx-LongCycle/drx-StartOffset for the primary DRX group are determined based on drx-LongCycleStartOffset2 field in drx2-Config field; and
  drx-LongCycle/drx-StartOffset for the secondary DRX group are determined based on drx-LongCycleStartOffset2 field in drx2-ConfigSecondaryGroup field.

If drx-LongCycleStartOffset2 field is indicated for the primary DRX group (if drx2-Config field is set to 'setup') and if drx-LongCycleStartOffset2 field is not indicated for the secondary DRX group (if drx2-ConfigSecondaryGroup field is set to 'release'),
  drx-LongCycle/drx-StartOffset for the primary DRX group are determined based on drx-LongCycleStartOffset2 field in drx2-Config field; and
  drx-LongCycle/drx-StartOffset for the secondary DRX group are determined based on drx-LongCycleStartOffset2 field in drx2-Config field.

If drx-LongCycleStartOffset2 field is not indicated for the primary DRX group (if drx2-Config field is set to 'release') and if drx-LongCycleStartOffset2 field is indicated for the secondary DRX group (if drx2-ConfigSecondaryGroup field is set to 'setup'),
  drx-LongCycle/drx-StartOffset for the primary DRX group are determined based on drx-LongCycleStartOffset field in drx-Config field.

drx-LongCycle/drx-StartOffset for the secondary DRX group are determined based on drx-LongCycleStartOffset2 field in drx2-ConfigSecondaryGroup field; and If drx-LongCycleStartOffset2 field is not indicated for the primary DRX group (if drx2-Config field is set to 'release') and if drx-LongCycleStartOffset2 field is not indicated for the secondary DRX group (if drx2-ConfigSecondaryGroup field is set to 'release'), drx-LongCycle/drx-StartOffset for the primary DRX group are determined based on drx-LongCycleStartOffset field in drx-Config field.

drx-LongCycle/drx-StartOffset for the secondary DRX group are determined based on drx-LongCycleStartOffset field in drx-Config field.

DRX3-Config IE for primary DRX group is included in drx3-Config field.

DRX3-Config IE in drx3-Config field provides additional DRX parameters for the primary DRX group.

```
DRX3-Config ::= SEQUENCE {
    onDurationStartAccumulated ENUMERATED {true}    OPTIONAL, -
- Need R
    BigFrameNumber INTEGER(0..1023)   OPTIONAL, -- Need R
    ReferenceFrameNumber1 ENUMERATED {512} OPTIONAL, -- Need
R
    ReferenceFrameNumber2 INTEGER(0..1023)   OPTIONAL, -- Need
R
    ...
}
```

DRX3-Config IE is to provide the configuration information related to on_duration_starting_point_determination_mode_2.

onDurationStartAccumulated field is an optional field.

If this field is present, the terminal determines the starting subframe of drx-onDurationTimer based on on_duration_starting_point_determination_mode_2.

If this field is absent, the terminal determines the starting subframe of drx-onDurationTimer based on on_duration_starting_point_determination_mode_1.

BigFrameNumber is an optional field. This field is related to second_counter. This field is absent if onDurationStartAccumulated field is absent.

If onDurationStartAccumulated field is present and BigFrameNumber is absent, the terminal initialize the second counter to zero.

If onDurationStartAccumulated field is present and BigFrameNumber is present, the terminal initialize the second counter to the value indicated in BigFrameNumber field.

ReferenceFrameNumber1 field is an optional field. This field absent if onDurationStartAccumulated field is absent. To determines the starting subframe of drx-onDurationTimer, the terminal uses the closest SFN as the drx-timeReferenceSFN preceding the reception of the DRX3-Config.

If onDurationStartAccumulated field is present and ReferenceFrameNumber1 field is absent, the terminal uses SFN 0 as drx-timeReferenceSFN.

If onDurationStartAccumulated field is present and ReferenceFrameNumber1 field is present, the terminal uses SFN 512 as drx-timeReferenceSFN.

ReferenceFrameNumber2 field is an optional field. This field absent if onDurationStartAccumulated field is absent. With regards to determination of the starting subframe for drx-onDurationTimer, the terminal updates the second_counter based on a first SFN and the value indicated in ReferenceFrameNumber1 field. The first SFN is the SFN when DRX3-Config is received.

If onDurationStartAccumulated field is present and ReferenceFrameNumber2 field is absent, the terminal does not update the second_counter.

If onDurationStartAccumulated field is present and ReferenceFrameNumber2 field is present, the terminal updates the second_counter.

onDurationStartAccumulated field being present is equivalent to starting subframe of drx-onDurationTimer being determined based on on_duration_starting_point_determination_mode_2.

onDurationStartAccumulated field being absent is equivalent to starting subframe of drx-onDurationTimer being determined based on on_duration_starting_point_determination_mode_1.

DRX3-Config IE for secondary DRX group is included in drx3-ConfigSecondaryGroup field.

Depending on presence/absence of onDurationStartAccumulated field, the terminal determines how to determine the starting subframe of drx-OndurationTimer for each DRX group.

In a first embodiment, the starting subframe of drx-OndurationTimer for primary DRX group and the starting subframe of drx-Ondurationtimer for secondary DRX group are determined based on separate IEs.

If onDurationStartAccumulated field is absent in DRX3-Config IE and onDurationStartAccumulated field is present in DRX3-ConfigSecondaryGroup IE, The terminal determines to use on_duration_starting_point_determination_mode_1 for the primary DRX group and on_duration_starting_point_determination_mode_2 for the secondary DRX group.

If onDurationStartAccumulated field is present in DRX3-Config IE and onDurationStartAccumulated field is absent in DRX3-ConfigSecondaryGroup IE, The terminal determines to use on_duration_starting_point_determination_mode_2 for the primary DRX group and on_duration_starting_point_determination_mode_1 for the secondary DRX group.

In a second embodiment, the starting subframe of drx-OndurationTimer for primary DRX group and the starting subframe of drx-Ondurationtimer for secondary DRX group are determined based on a single IE (onDurationStartAccumulated in DRX3-Config IE).

If onDurationStartAccumulated field is absent in DRX3-Config IE, the terminal determines to use on_duration_starting_point_determination_mode_1 for the primary DRX group and on_duration_starting_point_determination_mode_1 for the secondary DRX group.

If onDurationStartAccumulated field is present in DRX3-Config IE, the terminal determines to use on_duration_starting_point_determination_mode_2 for the primary DRX group and on_duration_starting_pointdetermination_mode_2 for the secondary DRX group.

In a third embodiment, the starting subframe of drx-OndurationTimer for primary DRX group and the starting subframe of drx-Ondurationtimer for secondary DRX group are determined based on a single IE or separate IEs.

If onDurationStartAccumulated field is absent in DRX3-Config IE,

The terminal determines to use on_duration_starting_point_determination_mode_1 for the primary DRX group.

If onDurationStartAccumulated field is present in DRX3-Config IE,

The terminal determines to use on_duration_starting_point_determination_mode_2 for the primary DRX group.

If onDurationStartAccumulated field is absent in DRX3-Config IE and onDurationStartAccumulated field is absent in DRX3-ConfigSecondaryGroup IE, The terminal determines to use on_duration_starting_point_determination_mode_1 for the secondary DRX group.

If onDurationStartAccumulated field is absent in DRX3-Config IE and onDurationStartAccumulated field is present in DRX3-ConfigSecondaryGroup IE, The terminal determines to use on_duration_starting_point_determination_mode_2 for the secondary DRX group.

If onDurationStartAccumulated field is present in DRX3-Config IE and onDurationStartAccumulated field is absent in DRX3-ConfigSecondaryGroup IE, The terminal determines to use on_duration_starting_point_determination_mode_2 for the secondary DRX group.

To save signaling overhead, parameters for on_duration_starting_point_determination_mode_2 can be shared between primary DRX group and secondary DRX group.

BigFrameNumber field is provided either in a DRX3-Config or in DRX3-ConfigSecondaryGroup.

If BigFrameNumber field is present in a DRX3-Config and if on_duration_starting_point_determination_mode_2 is configured both to the primary DRX group and to the secondary DRX group, The terminal applies the value indicated in BigFrameNumber field both to the primary DRX group and the secondary DRX group.

If BigFrameNumber field is present in a DRX3-Config-Secondary and if on_duration_starting_point_determination_mode_2 is configured only to the secondary DRX group, The terminal applies the value indicated in the BigFrameNumber field to the secondary DRX group.

If BigFrameNumber field is present neither in a DRX3-Config nor in DRX3-ConfigSecondary and if on_duration_starting_point_determination_mode_2 is configured both to the primary DRX group and the secondary DRX group, The terminal applies zero both to the primary DRX group and to the secondary DRX group.

That the starting subframe of drx-onDurationTimer is determined based on on_duration_starting_point_determination_mode_1 means that the starting subframe of drx-onDurationTimer is determined based on drx-LongCycle-StartOffset field in DRX-Config and first_counter and subframe number.

That the starting subframe of drx-onDurationTimer is determined based on on_duration_starting_point_determination_mode_2 means that the starting subframe of drx-onDurationTimer is determined based on drx-LongCycle-StartOffset2 field in DRX2-Config (or in DRX2-ConfigSecondaryGroup) and second_counter and first_counter and subframe number.

In another embodiment, that the starting subframe of drx-onDurationTimer is determined based on on_duration_starting_point_determination_mode_2 means that the starting subframe of drx-onDurationTimer is determined based on drx-LongCycleStartOffset2 field in DRX2-Config (or in DRX2-ConfigSecondaryGroup) and ReferenceFrameNumber2 in DRX3-Config (or in DRX3-ConfigSecondary Group).

In 2A-31, the terminal and the base station performs DRX operation based on the configuration information indicated in the RRCReconfiguration.

determining on_duration_starting_pointdetermination_mode

The terminal determines whether to use on_duration_starting_point_determination_mode_1 or on_duration_starting_point_determination_mode_2 for the primary DRX group and the secondary DRX group.

In a first embodiment, the terminal performs determination based on presence/absence of onDurationStartAccumulated field.

If onDurationStartAccumulated field is not indicated for the primary DRX group (if onDurationStartAccumulated field is absent in DRX3-Config), the terminal applies on_duration_starting_point_determination_mode_1 for the primary DRX group.

If onDurationStartAccumulated field is indicated for the primary DRX group (if onDurationStartAccumulated field is present in DRX3-Config), the terminal applies on_duration_starting_point_determination_mode_2 for the primary DRX group.

If onDurationStartAccumulated field is not indicated for the secondary DRX group (if onDurationStartAccumulated field is absent in DRX3-ConfigSecondaryGroup), the terminal applies on_duration_starting_point_determination_mode_1 for the secondary DRX group.

If onDurationStartAccumulated field is indicated for the secondary DRX group (if onDurationStartAccumulated field is present in DRX3-ConfigSecondaryGroup), the terminal applies on_duration_starting_point_determination_mode_2 for the secondary DRX group.

In a second embodiment, to reduce the signaling overhead, the terminal performs determination based on configured periodicity.

If an integer value is configured for long DRX cycle of the primary DRX group (drx-LongCycleStartOffset2 field is absent in DRX2-Config IE; or DRX2-Config IE is absent in MAC-CellGroupConfig IE), the terminal applies on_duration_starting_point_determination_mode_1 for the primary DRX group.

If a non-integer value is configured for long DRX cycle of the primary DRX group (drx-LongCycleStartOffset2 field is present in DRX2-Config IE), the terminal applies on_duration_starting_point_determination_mode_2 for the primary DRX group.

If an integer value is configured for long DRX cycle of the secondary DRX group (drx-LongCycleStartOffset2 field is absent in DRX2-ConfigSecondaryGroup IE; or DRX2-ConfigSecondaryGroup IE is absent in MAC-CellGroupConfig IE), the terminal applies on_duration_starting_point_determination_mode_1 for the secondary DRX group.

If a non-integer value is configured for long DRX cycle of the secondary DRX group (drx-LongCycleStartOffset2 field is present in DRX2-ConfigSecondaryGroup IE), the terminal applies on_duration_starting_point_determination_mode_2 for the secondary DRX group.

In a third embodiment, to achieve the signaling overhead reduction and to overcome the limitation of the second embodiment, the terminal performs determination based on the periodicity and the presence/absence of onDurationStartAccumulated field. The limitation of the second embodiment is that if an integer value of non divisor of 10240 is configured for DRX cycle, different outcome is produced for on_duration_starting_point_etermination_mode_1 and on_duration_starting_point_determination_mode_2 after SFN wraparound.

If a first integer value is configured for long DRX cycle of the primary DRX group (drx-LongCycleStartOffset2 field is absent in DRX2-Config IE and drx-LongCycleStartOffset field in DRX-Config indicates a first integer value for drx-LongCycle), The terminal applies on_duration_starting_point_determination_mode_1 for the primary DRX group.

If a second integer value is configured for long DRX cycle of the primary DRX group (drx-LongCycleStartOffset2 field is absent in DRX2-Config IE and drx-LongCycleStartOffset field in DRX-Config indicates a second integer value for drx-LongCycle) and If onDurationStartAccumulated field is not configured for the primary DRX group, The terminal applies on_duration_starting_point_determination_mode_1 for the primary DRX group.

If a second integer value is configured for long DRX cycle of the primary DRX group (drx-LongCycleStartOffset2 field is absent in DRX2-Config IE and drx-LongCycleStartOffset field in DRX-Config indicates a second integer value for drx-LongCycle) and If onDurationStartAccumulated field is configured for the primary DRX group (onDurationStartAccumulated field is present in DRX2-Config), The terminal applies on_duration_starting_point_determination_mode_2 for the primary DRX group.

If a first integer value is configured for long DRX cycle of the secondary DRX group (drx-LongCycleStartOffset2 field is absent in DRX2-ConfigSecondaryGroup IE and drx-LongCycleStartOffset field in DRX-Config indicates a first integer value for drx-LongCycle), The terminal applies on_duration_starting_point_determination_mode_1 for the secondary DRX group.

If a second integer value is configured for long DRX cycle of the secondary DRX group (drx-LongCycleStartOffset2 field is absent in DRX2-ConfigSecondaryGroup IE and drx-LongCycleStartOffset field in DRX-Config indicates a second integer value for drx-LongCycle) and If onDurationStartAccumulated field is not configured for the secondary DRX group, The terminal applies on_duration_starting_point_determination_mode_1 for the secondary DRX group.

If a second integer value is configured for long DRX cycle of the secondary DRX group (drx-LongCycleStartOffset2 field is absent in DRX2-ConfigSecondaryGroup IE and drx-LongCycleStartOffset field in DRX-Config indicates a second integer value for drx-LongCycle) and If onDurationStartAccumulated field is configured for the secondary DRX group (onDurationStartAccumulated field is present in DRX2-ConfigSecondaryGroup), The terminal applies on_duration_starting_pointdetermination_mode_2 for the secondary DRX group.

The first integer value is divisor of 10240 (i.e. 10, 20, 32, 40, 64, 80, 128, 160, 256, 320, 512, 640, 1024, 1280, 2048, 2560, 5120 or 10240). The second integer value is not divisor of 10240 (i.e. 60 or 70).

During the DRX operation, the terminal starts drx-OnDurationTimer at a specific slot of a specific subframe of a specific frame of a specific big frame.

If on_duration_starting_point_determination_mode_1 is applied, the specific subframe and the specific frame are determined based on the following equation.

$$[(\text{first\_counter} \times 10) + \text{subframe number}] \text{ modulo } (drx\text{−}LongCycle) = drx\text{−}StartOffset$$

For both the primary DRX group and the secondary DRX group, first_counter is initialized to the frame_number when the terminal receives the system information. first_counter is incremented by one every radio frame.

subframe number is the number of subframe starting from 0.

The specific frame is determined from the first_counter fulfilling the equation. the specific subframe is determined from the subframe number fulfilling the equation.

For the primary DRX group, drx-LongCycle and drx-StartOffset are determined from drx-LongCycleStartOffset field in the DRX-Config.

For the secondary DRX group, drx-LongCycle and drx-StartOffset are determined from drx-LongCycleStartOffset field in the DRX-Config.

If on_duration_starting_point_determination_mode_2 is applied, the specific subframe and the specific frame and specific big frame are determined based on the following equation.

$$[\text{second\_counter} * 10240 + (\text{first\_counter} \times 10) + \text{subframe number}] \text{ modulo } (drx\text{−}LongCycle) = drx\text{−}StartOffset$$

The specific frame is determined from the first_counter and the second_counter that fulfil the equation. The specific subframe is determined from the subframe number fulfilling the equation.

For both the primary DRX group and the secondary DRX group, the second_counter is initialized to the BigFrameNumber when the terminal receives a RRCReconfiguration. The second_counter is incremented by one when first_counter wrap around to zero. A single second_counter is used both for the primary DRX group and for the secondary DRX group.

For the primary DRX group, drx-LongCycle and drx-StartOffset are determined from drx-LongCycleStartOffset2 field in the DRX2-Config.

For the secondary DRX group, drx-LongCycle and drx-StartOffset are determined from drx-LongCycleStartOffset2 field in the DRX2-ConfigSecondaryGroup.

In an alternative embodiment, if on_duration_starting_point_determination_mode_2 is applied, the terminal starts drx-OnDurationTimer at a first subframe. The terminal determines a Nth first subframe occurs in the subframe fulfilling the following equation.

$$[(\text{first\_counter} \times 10) + \text{subframe number}] = (drx\text{-}timeReferenceSFN \times 10 + drx\text{-}StartOffset + N \times drx\text{-}LongCycle) \text{ modulo } (10240)$$

For the primary DRX group, drx-LongCycle and drx-StartOffset are determined from drx-LongCycleStartOffset2 field in the DRX2-Config.

For the secondary DRX group, drx-LongCycle and drx-StartOffset are determined from drx-LongCycleStartOffset2 field in the DRX2-ConfigSecondaryGroup.

During DRX operation, the terminal starts drx-OnDurationTimer for a DRX group at a subframe. the terminal monitors PDCCH when drx-OnDurationTimer is running. The terminal starts or restarts drx-InactivityTimer for a DRX group if PDCCH indicating new transmission is received on any serving cell of the DRX group.

The terminal monitors PDCCH of the serving cells of primary DRX group if/while drx-OnDurationTimer for the primary DRX group or drx-InactivityTimer for the primary DRX group or both are running.

The terminal monitors PDCCH of the serving cells of secondary DRX group if/while drx-OnDurationTimer for the secondary DRX group or drx-InactivityTimer for the secondary DRX group or both are running.

At some point of time, the base station determines to perform handover for the terminal to the second cell. The base station determines the configuration of the terminal in the second cell. The base station generates a third RRCReconfiguration message for handover towards the second cell.

In 2A-36, the base station transmits a third RRCReconfiguration to the terminal.

The third RRCReconfiguration includes the target cell information and DRX information to be applied by the terminal in the target cell.

In 2A-41, the terminal transmits RRCReconfigurationComplete in the second cell in response to the third RRCReconfiguration.

In 2A-46, the terminal receives a system information in the second cell. The system information includes frame_number field.

In 2A-51, the terminal and the base station perform DRX operation in the second cell.

The terminal and the base station determine the DRX parameters to be applied to the primary DRX group after handover as below.

- If the third RRCReconfiguration includes drx-Config field and drx-LongCycleStartOffset2 field in drx2-Config and onDurationStartAccumulated field in drx3-Config,
  - Terminal applies on_duration_starting_point_determination_mode_2 based on that onDurationStartAccumulated field is present in the third RRCReconfiguration; and
  - Terminal applies drx-LongCycleStartOffset2 field in the third RRCReconfiguration.
- If the third RRCReconfiguration includes neither drx-Config field nor drx-LongCycleStartOffset2 field in drx2-Config and if the third RRCReconfiguration includes onDurationStartAccumulated field in drx3-Config,
  - Terminal applies on_duration_starting_point_determination_mode_2 based on that onDurationStartAccumulated field is present in the third RRCReconfiguration; and
  - Terminal applies drx-LongCycleStartOffset2 field in the second RRCReconfiguration.
- If the third RRCReconfiguration does not include drx-Config field and if the third RRCReconfiguration includes drx2-Config set to 'release' and if the third RRCReconfiguration includes onDurationStartAccumulated field in drx3-Config,
  - Terminal applies on_duration_starting_point_determination_mode_2 based on that onDurationStartAccumulated field is present in the third RRCReconfiguration.
  - Terminal applies drx-LongCycleStartOffset field in the second RRCReconfiguration.
- If the third RRCReconfiguration does not include drx-Config field and if the third RRCReconfiguration includes drx2-Config set to 'release' and if the third RRCReconfiguration does not include onDurationStartAccumulated field in drx3-Config,
  - Terminal applies on_duration_starting_point_determination_mode_1 based on that onDurationStartAccumulated field is absent in the third RRCReconfiguration.
  - Terminal applies drx-LongCycleStartOffset field in the second RRCReconfiguration.

In short, the terminal applies, for DRX operation in the target cell, the drx-LongCycleStartOffset2 that have been received (applied/used) in the old cell, if the RRC message instructing handover towards the target cell does not include the drx-LongCycleStartOffset2. However, the terminal does not apply, for the DRX operation in the target cell, onDurationStartAccumulated that have been received (applied) in the old cell, even if the RRC message instructing handover towards the target cell does not include onDurationStartAccumulated.

The reason why drx-LongCycleStartOffset2 and onDurationStartAccumulated are handled differently is signaling efficiency. Since drx-LongCycleStartOffset2 field is multi-bit information and onDurationStartAccumulated field is single bit information, signaling overhead reduction is achieved by reusing the stored value in case of drx-LongCycleStartOffset2 field. However, for single bit information, reusing the stored value incur more overhead in case of releasing the value.

If the RRC message for handover from the first cell to the second cell include neither the first DRX parameter nor the second DRX parameter,

- The terminal applies in the second cell the first DRX parameter applied in the first cell and
- The terminal applies in the second cell the second DRX parameter received in the second cell.

If the RRC message for handover from the first cell to the second cell does not include the second DRX parameter,

- The terminal does not apply in the second cell the first DRX parameter applied in the first cell and
- The terminal does not apply in the second cell the second DRX parameter applied in the first cell.

The terminal and the base station perform DRX operation based on the DRX parameters and the way how to determine the starting subframe of drx-OnDurationTimer.

The first DRX parameter is drx-LongCycleStartOffset2 and the second DRX parameter is onDurationStartAccumulated.

The terminal and the base station manage the first_counter and the second_counter as below.

The first_counter at a specific time holds system frame number at the specific time.

The second_counter at a specific time holds big frame number at the specific time. A big frame consists with 1024 radio frames.

The first_counter is initialized based on the value indicated in frame_number field when a system information containing frame_number field is received in a first cell.

The first_counter increments by one every radio frame.

When handover towards a second cell is executed,

- if the terminal is aware that the target cell and the source cell have SFN and frame boundary alignment, the terminal continues to use in the second cell the first_counter used in the first cell.
- if the terminal is not aware that target cell and the source cell have SFN and frame boundary alignment, the terminal initializes the first_counter based on the value indicated in frame_number in the system information received in the second cell.
  - the terminal is indicated by the base station via a RRC message whether cells in a frequency layer have SFN alignment and frame boundary alignment.

The second_counter is initialized to zero when DRX3-Config is received and the BigFrameNumber is not indicated in the DRX3-Config.

The second_counter is initialized to the value indicated in BigFrameNumber when DRX3-Config is received and the BigFrameNumber is indicated in the DRX3-Config.

The second_counter is updated based on ReferenceFrameNumber2 and the first SFN.

- The first SFN is the frame number of the frame when RRC message containing DRX3-Config is received.
- If the difference between ReferenceFrameNumber2 and first SFN is smaller than or equal to a specific integer (e.g. 256), the second_counter is not updated.
- If the difference between ReferenceFrameNumber2 and first SFN is greater than the specific integer (e.g. 256), the second_counter is updated by one (updated second_counter=second_counter+1).
- Upon MAC reset for handover, the terminal initializes the second_counter to zero.
- Upon Lower Layer Triggered Mobility (LTM) handover, the base station indicates the terminal whether to reset the second_counter to zero or to continue to use the second_counter.
  - The indication can be sent in a MAC Control Element (CE) instructing LTM handover towards the second cell. If a specific field in the MAC CE is set to a first value, the terminal reset the second_counter at a point of time. If the specific field in the MAC CE is set to a second value, the terminal continues to use the second_counter in the second cell.
  - The point of time is after receiving the MAC CE in the first cell and before performing first uplink transmission in the second cell.

Figure 3A:
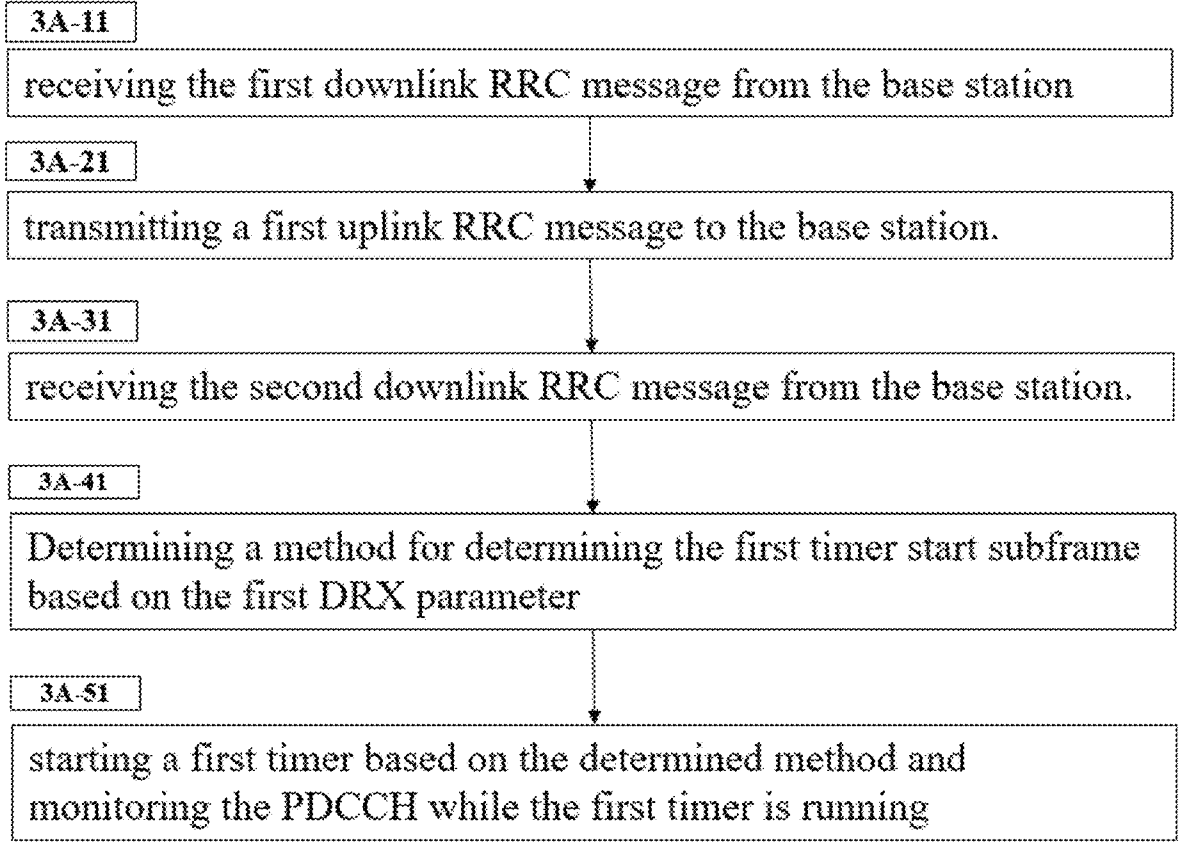
FIG. 3A is a flow diagram illustrating an DRX operation of the terminal.

FIG. 3A is a flow diagram illustrating an DRX operation of the terminal.

In 3A-11, the UE receives the first downlink RRC message from the base station. The first downlink RRC message includes information related to an uplink traffic pattern report.

In 3A-21, the UE transmits a first uplink RRC message (UEAssistanceInformation) to the base station. The first uplink RRC message includes information on an uplink traffic pattern.

In 3A-31, the UE receives the second downlink RRC message from the base station. The second downlink RRC message includes one or more DRX parameters.

In 3A-41, the UE determines a method for determining the first timer start subframe based on the first DRX parameter (onDurationStartAccumulated). The UE uses the first method (on_duration_starting_point_determination_mode_1) if the first DRX parameter is absent, and uses the second method (on_duration_starting_point_determination_mode_2) if the first DRX parameter is present.

In 3A-51, the UE starts a first timer (drx-onDurationTimer) based on the determined method and monitors the PDCCH while the first timer is running.

If the second method is used, the UE sets the initial value of the first counter based on the second DRX parameter (BigFrameNumber).

If the second DRX parameter is present in the second downlink RRC message, the UE sets the initial value of the first counter to the value indicated by the second DRX parameter.

If the second DRX parameter is absent in the second downlink RRC message, the UE sets the initial value of the first counter to 0.

The UE increases the first counter by 1 if the difference between the first frame number and the third DRX parameter (ReferenceFrameNumber2) is greater than a predetermined value. The first frame number is a frame number of a frame in which the second downlink RRC message is received.

Figure 4A:
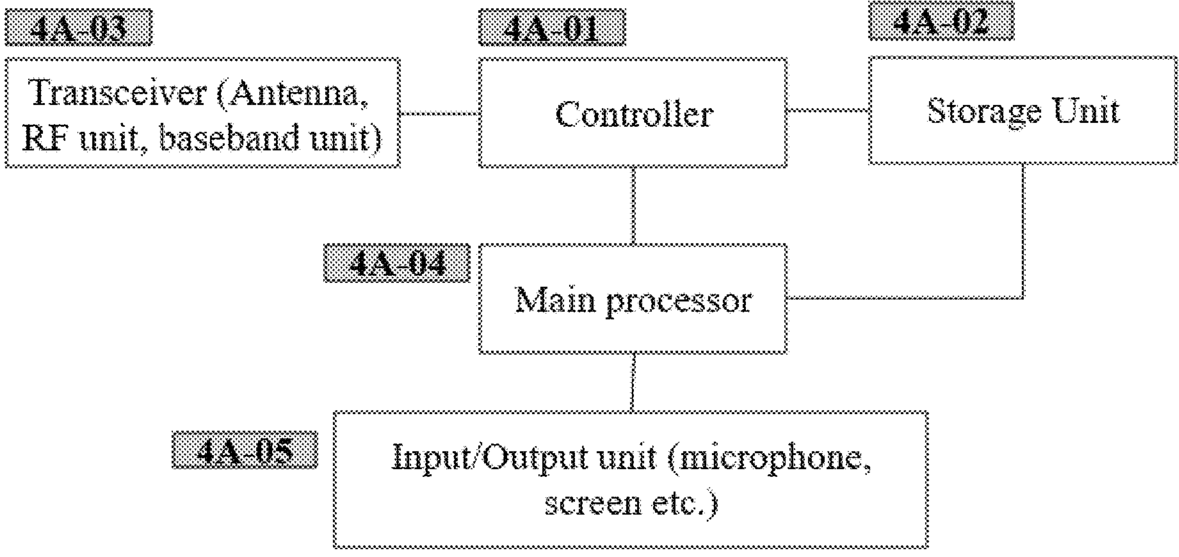
FIG. 4A is a block diagram illustrating the internal structure of a UE to which the disclosure is applied.

FIG. 4A is a block diagram illustrating the internal structure of a Terminal to which the disclosure is applied.

Referring to the diagram, the terminal includes a controller (4A-01), a storage unit (4A-02), a transceiver (4A-03), a main processor (4A-04) and I/O unit (4A-05).

The controller (4A-01) controls the overall operations of the terminal in terms of mobile communication. For example, the controller (4A-01) receives/transmits signals through the transceiver (4A-03). In addition, the controller (4A-01) records and reads data in the storage unit (4A-02). To this end, the controller (4A-01) includes at least one processor. For example, the controller (4A-01) may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit (4A-02) stores data for operation of the terminal, such as a basic program, an application program, and configuration information. The storage unit (4A-02) provides stored data at a request of the controller (4A-01).

The transceiver (4A-03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (4A-04) controls the overall operations other than mobile operation. The main processor (4A-04) process user input received from I/O unit (4A-05), stores data in the storage unit (4A-02), controls the controller (4A-01) for required mobile communication operations and forward user data to I/O unit (4A-05).

I/O unit (4A-05) consists of equipment for inputting user data and for outputting user data such as a microphone and a screen. I/O unit (4A-05) performs inputting and outputting user data based on the main processor's instruction.

Figure 4B:
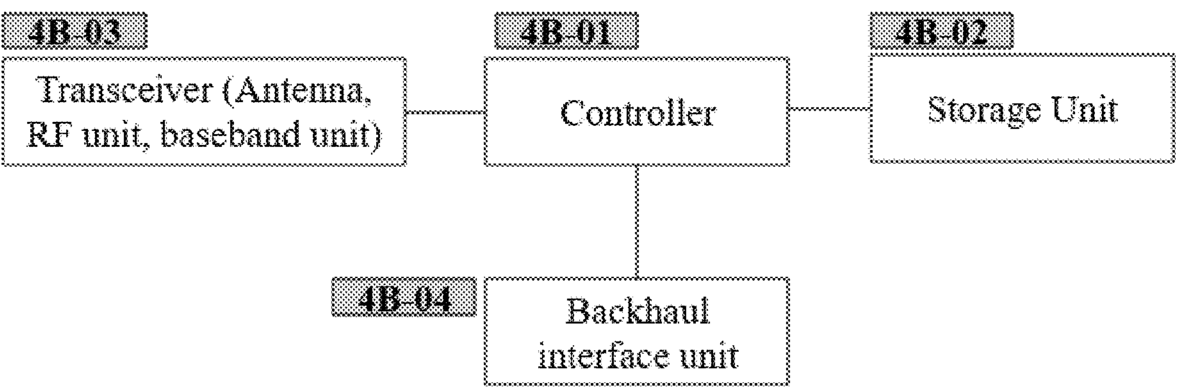
FIG. 4B is a block diagram illustrating the configuration of a base station according to the disclosure.

FIG. 4B is a block diagram illustrating the configuration of a base station according to the disclosure.

As illustrated in the diagram, the base station includes a controller (4B-01), a storage unit (4B-02), a transceiver (4B-03) and a backhaul interface unit (4B-04).

The controller (4B-01) controls the overall operations of the main base station. For example, the controller (4B-01) receives/transmits signals through the transceiver (4B-03), or through the backhaul interface unit (4B-04). In addition, the controller (4B-01) records and reads data in the storage unit (4B-02). To this end, the controller (4B-01) may include at least one processor. The controller controls transceiver, storage unit and backhaul interface such that base station operation illustrated in FIG. 2A are performed.

The storage unit (4B-02) stores data for operation of the main base station, such as a basic program, an application program, and configuration information. Particularly, the storage unit (4B-02) may store information regarding a bearer allocated to an accessed UE, a measurement result reported from the accessed UE, and the like. In addition, the storage unit (4B-02) may store information serving as a criterion to deter mine whether to provide the terminal with multi-connection or to discontinue the same. In addition, the storage unit (4B-02) provides stored data at a request of the controller (4B-01).

The transceiver (4B-03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (4B-04) provides an interface for communicating with other nodes inside the network. The backhaul interface unit (4B-04) converts a bit string transmitted from the base station to another node, for example, another base station or a core network, into a physical signal, and converts a physical signal received from the other node into a bit string.

Below table lists acronym used in the present invention.

| Acronym | Full name |
|---|---|
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RAR | Random Access Response |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SS | Search Space |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

-continued

| Acronym | Full name |
|---|---|
| CRP | Cell Reselection Priority |
| FPP | First positioning protocol |
| SPP | Second positioning protocol |
| DL-PRS | Downlink-Positioning Reference Signal |
| SL-PRS | Sidelink-Positioning Reference Signal |
| DL-AoD | Downlink Angle-of-Departure |
| GNSS | Global Navigation Satellite System |

What is claimed is:

1. A method by a terminal, the method comprising:

receiving, by the terminal from a base station, a first radio resource control (RRC) message, wherein the first RRC message comprises a set of parameters for discontinuous reception (DRX);

determining, by the terminal, a first subframe;

starting, by the terminal and based on the first subframe, a first timer of a primary DRX group; and starting, by the terminal and based on Physical Downlink Control Channel (PDCCH), a second timer of the primary DRX group, wherein the terminal monitors PDCCH for the primary DRX group while:

the first timer of the primary DRX group is running; or the second timer of the primary DRX group is running, wherein the first subframe is determined based on a first counter and a second counter in case that a parameter indicating a non-integer DRX cycle is present in the first RRC message, wherein the second counter is set to one based on a parameter related to a reference System Frame Number (SFN) being comprised in the first RRC message, and wherein the second counter is set to zero based on the parameter related to the reference SFN not being comprised in the first RRC message.

2. The method of claim 1, wherein the second counter is set to one in case that a specific condition defined based on a frame number of a specific radio frame and the reference SFN is fulfilled.

3. The method of claim 2, wherein the specific condition is fulfilled in case that a difference between the reference SFN and the frame number of the specific radio frame is greater than a specific integer.

4. The method of claim 3, wherein the specific radio frame is a radio frame when the first RRC message is received.

5. The method of claim 1, wherein the set of parameters for DRX comprises:

a set of parameters for the primary DRX group;

a set of parameters for a secondary DRX group;

the parameter indicating the non-integer DRX cycle; and the parameter related to the reference SFN.

6. The method of claim 5, wherein the set of parameters for DRX further comprise a parameter indicating an integer DRX cycle.

7. The method of claim 5, wherein the set of parameters for the primary DRX group comprises:

a parameter for the first timer of the primary DRX group; and a parameter for the second timer of the primary DRX group.

8. The method of claim 5, wherein the set of parameters for the secondary DRX group comprises:

a parameter for a first timer of the secondary DRX group; and a parameter for a second timer of the secondary DRX group.

9. The method of claim 1, further comprising:

determining, by the terminal, a second subframe; and starting, by the terminal and based on the second subframe, a first timer of a secondary DRX group.

10. The method of claim 9, wherein the second subframe is determined based on the first counter and the second counter in case that the parameter indicating the non-integer DRX cycle is present in the first RRC message.

11. The method of claim 10, wherein the second subframe is determined based on the first counter and not based on the second counter in case that the parameter indicating the non-integer DRX cycle is not present in the first RRC message.

12. The method of claim 1, wherein the terminal starts the second timer of the primary DRX group in case that PDCCH indicating new transmission is received on a serving cell of the primary DRX group.

13. The method of claim 1, wherein the first timer of the primary DRX group starts based on a periodicity and the second timer of the primary DRX group starts based on an event.

14. The method of claim 1, further comprising:

receiving, by the terminal from the base station, a second RRC message, wherein the second RRC message instructs reconfiguration with synchronization from a first cell to a second cell;

receiving, by the terminal from the base station, system information in the second cell;

determining, by the terminal, the first subframe; and starting, by the terminal and based on the first subframe, the first timer of the primary DRX group.

15. The method of claim 14, wherein the first subframe is determined based on the first counter and the second counter in case that:

the first RRC message comprises the set of parameters for DRX; and the second RRC message comprises the parameter indicating the non-integer DRX cycle.

16. The method of claim 14, wherein the first subframe is determined based on the first counter and not based on the second counter in case that:

the first RRC message comprises the set of parameters for DRX; and the second RRC message does not comprise the parameter indicating the non-integer DRX cycle.

17. The method of claim 1, wherein the first subframe is determined based on the first counter and not based on the second counter in case that:

the first RRC message comprises the set of parameters for DRX; and the first RRC message does not comprise the parameter indicating the non-integer DRX cycle.

18. The method of claim 15, wherein the second counter is set to zero in case that the parameter related to the reference SFN is not comprised in the second RRC message.

19. The method of claim 15, wherein the second counter is set to one in case that:

the parameter related to the reference SFN is comprised in the second RRC message; and a specific condition related to a frame number of a specific frame and the reference SFN is fulfilled.

20. A terminal comprising:

a transceiver, a memory, and a controller coupled to the transceiver and the memory, wherein the controller is configured to cause the terminal to:

receive, from a base station, a first radio resource control (RRC) message, wherein the first RRC message comprises a set of parameters for discontinuous reception (DRX), determine a first subframe, start, based on the first subframe, a first timer of a primary DRX group, and start, based on Physical Downlink Control Channel (PDCCH) monitoring, a second timer of the primary DRX group, wherein the terminal monitors PDCCH for the primary DRX group while:

the first timer of the primary DRX group is running; or the second timer of the primary DRX group is running, wherein the first subframe is determined based on a first counter and a second counter in case that a parameter indicating a non-integer DRX cycle is present in the first RRC message, wherein the second counter is set to one based on a parameter related to a reference System Frame Number (SFN) being comprised in the first RRC message, and wherein the second counter is set to zero based on the parameter related to the reference SFN not being comprised in the first RRC message.

* * * * *